United States Patent
Buset et al.

(10) Patent No.: US 12,283,991 B2
(45) Date of Patent: Apr. 22, 2025

(54) METHOD OF TRANSIENT MANAGEMENT IN OPTICAL TRANSMISSION SYSTEMS

(71) Applicant: Infinera Corp., San Jose, CA (US)

(72) Inventors: Jonathan M. Buset, San Jose, CA (US); Stephane St. Laurent, Roxboro (CA); Daniel Fonseca, San Jose, CA (US); Nisar Ahmed, Bellevue, WA (US); Sanjeev Ramachandran, Manipal (IN); Ashok Kunjidhapatham, Devarachikkanahalli (IN); Thomas Gerard, Campbell, CA (US)

(73) Assignee: Infinera Corporation, San Jose, CA (US)

( * ) Notice: Subject to any disclaimer, the term of this patent is extended or adjusted under 35 U.S.C. 154(b) by 195 days.

(21) Appl. No.: 18/297,381

(22) Filed: Apr. 7, 2023

(65) Prior Publication Data
US 2023/0327762 A1 Oct. 12, 2023

Related U.S. Application Data

(60) Provisional application No. 63/329,217, filed on Apr. 8, 2022.

(51) Int. Cl.
H04B 10/00 (2013.01)
H04B 10/2537 (2013.01)
H04J 14/00 (2006.01)

(52) U.S. Cl.
CPC ................ *H04B 10/2537* (2013.01)

(58) Field of Classification Search
CPC ........... H04J 14/0254; H04J 14/0256; H04J 14/0257; H04J 14/0267; H04B 10/296
See application file for complete search history.

(56) References Cited

U.S. PATENT DOCUMENTS

| | | | |
|---|---|---|---|
| 2018/0123724 A1* | 5/2018 | Zhang | H04J 14/0271 |
| 2022/0256263 A1* | 8/2022 | Al Sayeed | H04J 14/0257 |

* cited by examiner

*Primary Examiner* — Daniel G Dobson (57) ABSTRACT

Disclosed herein are methods and systems for configuring a spectral loading pattern for a transmission line segment in an optical network, the method comprising obtaining at least one loading policy, activating at least one of the at least one loading policy, receiving a plurality of requested operations, obtaining one or more static datapoint and one or more dynamic datapoint associated with the transmission line segment, obtaining loading parameters and one or more loading algorithm from the at least one activated loading policy, generating a loading response according to the one or more loading algorithm, and changing a spectral loading pattern of the transmission line segment based on the loading response. The requested operations may identify operations to be executed in either of a current cycle or one or more subsequent cycle. The loading response may identify a subset of the operations to be executed in the current cycle.

20 Claims, 4 Drawing Sheets

METHOD OF TRANSIENT MANAGEMENT IN OPTICAL TRANSMISSION SYSTEMS

CROSS-REFERENCE TO RELATED APPLICATIONS

This application claims the benefit of U.S. Provisional Patent Application No. 63/329,217, which was filed on Apr. 8, 2022, the contents of which are incorporated herein by reference in their entirety.

BACKGROUND

In optical communication systems, stimulated Raman scattering (SRS) is a phenomenon by which power from optical carriers having shorter wavelengths is transferred to optical carriers having longer wavelengths during transmission. Because of this phenomenon, loading (i.e., adding or removing) optical carriers may cause existing optical carriers to suffer traffic loss if the power transient is large enough and the optical carrier does not have a sufficiently large design margin to overcome such impairments.

Optical communication systems capable of transporting data on multiple bands—such as a C-band, an L-band, and an O-band—are inherently susceptible to transient changes in spectral shape caused by SRS because of their large bandwidth and high power requirements. As such, any loading changes may impact the spectral shape throughout the system due to loading-induced changes in the SRS tilt.

Optical communication systems provided with amplified spontaneous emission (ASE) idlers may mitigate some transient effects by maintaining the system near full spectral loading and making small perturbations by slowly swapping between ASE and optical signals during loading changes. However, ASE loading by itself does not inherently solve the problem of optimizing and prioritizing traffic to balance transients with operation timing.

SUMMARY

The methods and systems disclosed herein solve these problems by providing a loading management module that is configured to filter, sort, and/or prioritize service change requests using loading algorithms to dynamically manage power transients and maintain system performance during loading changes.

In one aspect, the present disclosure relates to a network element, comprising: a processor and a non-transitory computer readable memory storing instructions that, when executed by the processor, cause the processor to: obtain and store at least one loading policy for a transmission line segment that is currently operating, the at least one loading policy comprising a combination of loading parameters and one or more loading algorithm for one or more loading management operation type associated with the transmission line segment; activate at least one of the at least one loading policy; receive a plurality of requested service operations to change a spectral loading pattern of the transmission line segment, the requested service operations identifying a plurality of loading management operations to be executed in either of a current loading management operation cycle or one or more subsequent loading management operation cycle; obtain one or more static datapoint and one or more dynamic datapoint associated with the transmission line segment; obtain the loading parameters and the one or more loading algorithm from the at least one of the at least one loading policy that was activated; generate, according to the one or more loading algorithm, a loading response based at least in part on the one or more static datapoint, the one or more dynamic datapoint, and the loading parameters from the at least one of the at least one loading policy that was activated, the loading response identifying a subset of the loading management operations to be executed in the current loading management operation cycle; and change the spectral loading pattern of the transmission line segment based on the loading response.

In another aspect, the present disclosure relates to a method for configuring a spectral loading pattern, comprising: obtaining at least one loading policy for a transmission line segment that is currently operating, the at least one loading policy comprising a combination of loading parameters and one or more loading algorithm for one or more loading management operation type associated with the transmission line segment; activating, at a network element of the transmission line segment, at least one of the at least one loading policy; receiving a plurality of requested service operations to change a spectral loading pattern of the transmission line segment, the requested service operations identifying a plurality of loading management operations to be executed in either of a current loading management operation cycle and one or more subsequent loading management operation cycle; obtaining one or more static datapoint and one or more dynamic datapoint associated with the transmission line segment; obtaining the loading parameters and the one or more loading algorithm from the at least one of the at least one loading policy that was activated; generating, according to the one or more loading algorithm, a loading response based at least in part on the one or more static datapoint, the one or more dynamic datapoint, and the loading parameters from the at least one of the at least one loading policy that was activated, the loading response identifying a subset of the loading management operations to be executed in the current loading management operation cycle; and changing the spectral loading pattern of the transmission line segment based on the loading response.

Implementations of the above techniques include methods, apparatus, systems, and computer program products. One such computer program product is suitably embodied in a non-transitory machine-readable medium that stores instructions executable by one or more processor. The instructions are configured to cause the one or more processor to perform the above-described actions.

The details of one or more implementation of the subject matter of this specification are set forth in the accompanying drawings and the description below. Other aspects, features, and advantages will become apparent from the description, the drawings, and the claims.

BRIEF DESCRIPTION OF DRAWINGS

The accompanying drawings, which are incorporated in and constitute a part of this specification, illustrate one or more implementation described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

The following detailed description of example embodiments refers to the accompanying drawings. The same reference numbers in different drawings may identify the same or similar elements.

As used herein, the terms "comprises," "comprising," "includes," "including," "has," "having", or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital components, or one or more suitably programmed processor (e.g., microprocessors) and associated hardware and software, or hardwired logic. Also, "components" may perform one or more function. The term "component" may include hardware, such as a processor (e.g., microprocessor), a combination of hardware and software, and/or the like. Software may include one or more computer executable instruction that when executed by one or more component cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light path. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may carry an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may carry a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node.

Amplified spontaneous emission (ASE) is light produced by spontaneous emission that has been optically amplified by the process of stimulated emission in a gain medium. ASE is light that is incoherent and causes perturbations on the optical link. Every optical amplifier, e.g., Erbium-Doped Fiber Amplifiers (EDFAs) and Raman amplifiers, emit ASE. If an amplified spontaneous emission power level is too high relative to the transmission signal power level, the transmission signal in the fiber optic cable will be unreadable due to a low signal to noise ratio.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band. Further, the O-band is a band of light having a wavelength between 1260 nm to 1360 nm.

As used herein, a reconfigurable add-drop multiplexer (ROADM) node refers to an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar light wave circuit (PLC), and wavelength selective switching (WSS)—though the WSS has become the dominant technology. A ROADM system is a metro/regional wavelength division multiplexing (WDM) or long-haul dense wavelength division multiplexing (DWDM) system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

Figure 1:
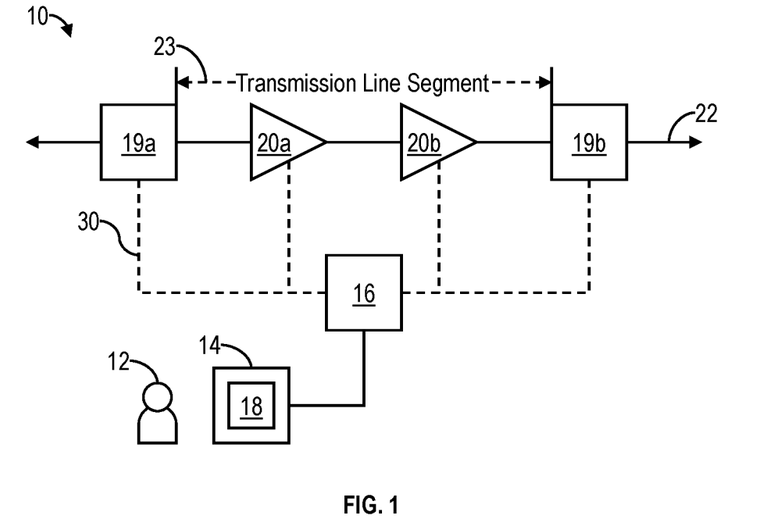
FIG. 1 is a diagrammatic view of hardware forming a system having an exemplary optical network and a network administration device having a loading management module designed to dynamically, create, install, and activate loading policies that may be used to configure spectral loading in the optical network constructed in accordance with one embodiment of the present disclosure.

FIG. 1 is a diagrammatic view of hardware forming an exemplary system 10 designed to allow a user to dynamically create, install, and activate loading policies that may be used to configure spectral loading in a transmission line segment 23 of an optical network 22 constructed in accordance with one embodiment of the present disclosure. A user 12 may interact with the system 10 using a user device 14 that may be used to request, from a network administration device 16, a graphical user interface 18 (hereinafter "GUI 18") configured to accept input from the user 12 that may be transmitted to the network administration device 16 and/or one or more optical node 19, such as optical node 19a and/or optical node 19b, of the optical network 22.

The network administration device 16 may be connected to the optical nodes 19a and 19b in the optical network 22 and the user device 14 via a network 30. In some embodiments, the network 30 may be the Internet and/or other network. For example, if the network 30 is the Internet, the GUI 18 of the system 10 may be delivered through a series of web pages or private internal web pages of a company or corporation, which may be written in hypertext markup language. It should be noted that the GUI 18 of the system 10 may be another type of interface including, but not limited to, a Windows-based application, a tablet-based application, a mobile web interface, an application running on a mobile device, and/or the like.

The network 30 may be almost any type of network. For example, in some embodiments, the network 30 may be a version of an Internet network (e.g., exist in a TCP/IP-based network). It is conceivable that in the near future, embodiments within the present disclosure may use more advanced networking technologies.

Optical network 22 may include any type of network that uses light as a transmission medium. For example, optical network 22 may include a wavelength division multiplexed optical communication system, a fiber-optic based network, an optical transport network, a laser diode network, an infrared network, and/or a combination of these or other types of optical networks. The optical network may be provided with one or more optical amplifier 20, such as optical amplifier 20a and optical amplifier 20b.

Each of the one or more optical node 19 may be a reconfigurable add-drop multiplexer (ROADM) node. The transmission line segment 23 connects optical nodes 19 and optical amplifiers 20 in the optical network 22. The network administration device 16 may also be connected to and communicate with the optical amplifiers 20a and 20b via the network 30. As used herein, "network elements 16, 19, 20" refers to one or more of the network administration device 16, the optical nodes 19, and the optical amplifiers 20.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more function described as being performed by another one or more of the devices of the system 10. Devices of the system 10 may interconnect via wired connections, wireless connections, or a combination of wired and wireless connections.

Figure 2:
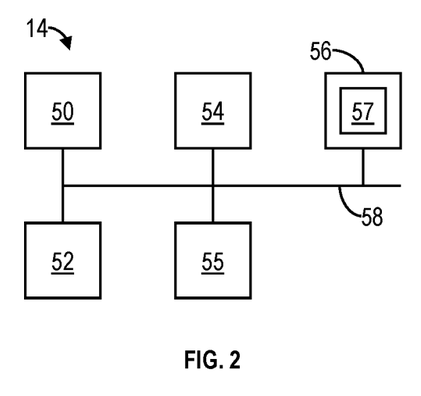
FIG. 2 is a diagrammatic view of an exemplary user device for use in the system designed to dynamically, create, install, and activate loading policies that may be used to configure spectral loading in the optical network illustrated in FIG. 1.

As shown in FIG. 2, the one or more user device 14 of the system 10 may include, but are not limited to, implementation as a personal computer, a cellular telephone, a smart phone, a network-capable television set, a tablet, a laptop computer, a desktop computer, a network-capable handheld device, a server, a digital video recorder, a wearable network-capable device, and/or the like.

In some embodiments, the user device 14 may include one or more input device 50 (hereinafter "input device 50"), one or more output device 52 (hereinafter "output device 52"), one or more processor 54 (hereinafter "processor 54"), one or more communication device 55 (hereinafter "communication device 55") capable of interfacing with the network 30, one or more non-transitory memory 56 (hereinafter "memory 56") storing processor executable code and/or software application(s), including, for example, a web browser capable of accessing a website and/or communicating information and/or data over a wireless or wired network (e.g., network 30), and/or the like. The input device 50, output device 52, processor 54, communication device 55, and memory 56 may be connected via a path 58 such as a data bus that permits communication among the components of user device 14.

The memory 56 may store an application 57 that, when executed by the processor 54, causes the user device 14 to display the GUI 18. In some embodiments, the application 57 is programmed to cause the processor 54 to provide the GUI 18 that allows the user 12 to interact with both historical and real-time information gathered from the network elements 16, 19, 20 as will be described further herein. The input device 50 may be capable of receiving information input from the user 12 and/or processor 54, and transmitting such information to other components of the user device 14 and/or the network 30. For instance, the user 12 may input one or more loading request (i.e., one or more requested service operations) in the GUI 18 and the user device 14 may transmit the loading request to the network administration device 16 and/or the optical node 19 over the network 30. Each loading request may include one or more requested service operation. Each requested service operation identifies at least one loading management operation to be executed in either of a current loading management operation cycle or one or more subsequent loading management operation cycle. As will be discussed below, the network administration device 16 saves the requested service operations from the one or more loading request for subsequent determination of including a subset of the requested service operations in either of a current loading management operation cycle or one or more subsequent loading management operation cycle to change the spectral loading pattern of the transmission line segment 23 in a manner that is not disruptive to the optical network 22.

In some embodiments, the GUI 18 may be configured to accept and/or guide input from the user 12 to generate, install, and/or edit a loading policy. A loading policy, as used herein, refers to a combination of operational and/or loading parameters and one or more loading algorithm for different types of loading management operations that enable a user to change a spectral loading pattern, for a given set of static datapoints and dynamic datapoints associated with an operational transmission line segment such as transmission line segment 23.

Exemplary static datapoints may be specifically associated with the transmission line segment 23 or the equipment (i.e., network elements 16, 19, 20) in the system 10. Static datapoints associated with the transmission line segment 23 may include: a capability of the transmission line segment 23 to carry certain optical signals, wherein the capability is one of C band only, C and L band capable, and C and L band equipped; a type of fiber (per fiber span) of the transmission line segment 23; a length (per fiber span) of the transmission line segment 23; and a number of fiber spans in the transmission line segment 23. Static datapoints associated with the equipment in the system 10 may include a composition of the equipment and/or a capability of the equipment, such as a type of ROADM of one or more of the optical nodes 19a, 19b in an embodiment where one or more of the optical nodes 19a, 19b is a ROADM, and a type of amplifier of one or more of the optical amplifiers 20a, 20b, which each may be one of an EDFA, a Raman amplifier, and a combination of an EDFA and a Raman amplifier.

Exemplary dynamic datapoints may include an operational status of the system 10 to communicate optical signals in each frequency band, an operational status of an ASE idler, a current spectral loading of the network 22 and/or loading of transmission line segment 23 (including, for example, currently active optical carriers, the bandwidths of such optical carriers, and the center frequencies of such optical carriers), an operational status of each active optical service, and a passband health status (including, for example, whether or not the passband is within a margin of error of a predetermined target power level for the passband). The operational status of the system 10 to communicate optical signals in each frequency band may indicate whether the system's 10 capability to communicate optical signals in one or more of the C band and the L band is on (i.e., operative and activated), off (i.e., operative and deactivated), or failed (i.e., inoperative).

Loading management operations generally refer to workflows at the level of the transmission line segment 23 for sequencing and coordinating power control operations for the optical nodes 19a, 19b, one or more WSS 110, 112 (shown in FIG. 5) contained within the optical nodes 19a, 19b, and the optical amplifiers 20a, 20b. Sequencing of the workflows may be different for each loading management operation type. Exemplary loading management operations include, but are not limited to, service activation (i.e., activation of a particular channel in a band), service deactivation (i.e., deactivation of a particular channel in a band), band activation (i.e., activation of a complete band), band deactivation (i.e., deactivation of a complete band), segment activation (i.e., activation of both C and L bands at the same time), and segment deactivation (i.e., deactivation of both C and L bands at the same time). Loading policies may be specifically directed to one loading management operation (e.g., service activation only), directed to different types of loading management operations (e.g., service activation and deactivation), or globally directed to cover all loading management operations (e.g., system default static loading policies). As further described herein, for every loading management operation, there may be an associated loading policy.

Loading parameters are parameters that influence a loading pattern (i.e., by determining which loading management operations are to be executed in a current loading management operation cycle and/or in which order the loading management operations are to be executed) in a transmission line segment and may be a combination of attributes. Exemplary loading parameters include, but are not limited to: loading management operation type (e.g., activation, deactivation, etc.) of the requested loading and whether such loading management operation type is to be prioritized; frequency range of the requested loading and whether such frequency range is to be prioritized; bandwidth of the requested loading and whether such bandwidth is to be prioritized; quality of service (QoS) requirements; selection of a loading algorithm; region in a spectrum where requested loading is to take place and whether such region is to be prioritized; maximum power change allowed due to loading; loading factor for a given range of current loading; allowable loading limit for a given range of current loading; whether to consider loading criteria (e.g., minimum loading criteria); topology of the line segment (e.g., types of amplifiers, number of amplifiers, type of fiber, C band, L band, or C+L band, offsets that are being configured, number of network spans, etc.); and load balancing. Loading policies drive loading patterns. The loading pattern may be dynamically derived depending on the loading policy and current system conditions.

It should be noted that the preceding loading parameters were provided for the purposes of illustration only and should not be considered a complete list of possible loading parameters. A person of skill in the art will appreciate that any number of loading parameters may influence the loading pattern in the transmission line segment.

Loading algorithms are algorithms that dynamically influence (i.e., by prioritizing, sorting, and/or selecting) which loading management operations are to be executed in a current loading management operation cycle. Selection of a loading algorithm may be based on, for example, a complexity of an implementation of the system 10, whether a certain loading management operation type is to be prioritized (e.g., service restoration), which release or version of the loading management module 92 is currently deployed, whether or not the optical transmission system 10 is provided with an ASE idler, or an operational status of such an ASE idler. In some embodiments, the loading management module 92 may dynamically change between ASE loading algorithms and non-ASE loading algorithms based on the operational status of the ASE idler. The loading algorithms may take the static characteristics and the dynamic characteristics as inputs. The loading algorithms may also take as inputs, for example, a frequency range of one or more channel, a size of one or more passband, a definition of one or more spectral region, a type of one or more service, and a priority of one or more service.

Figure 5:
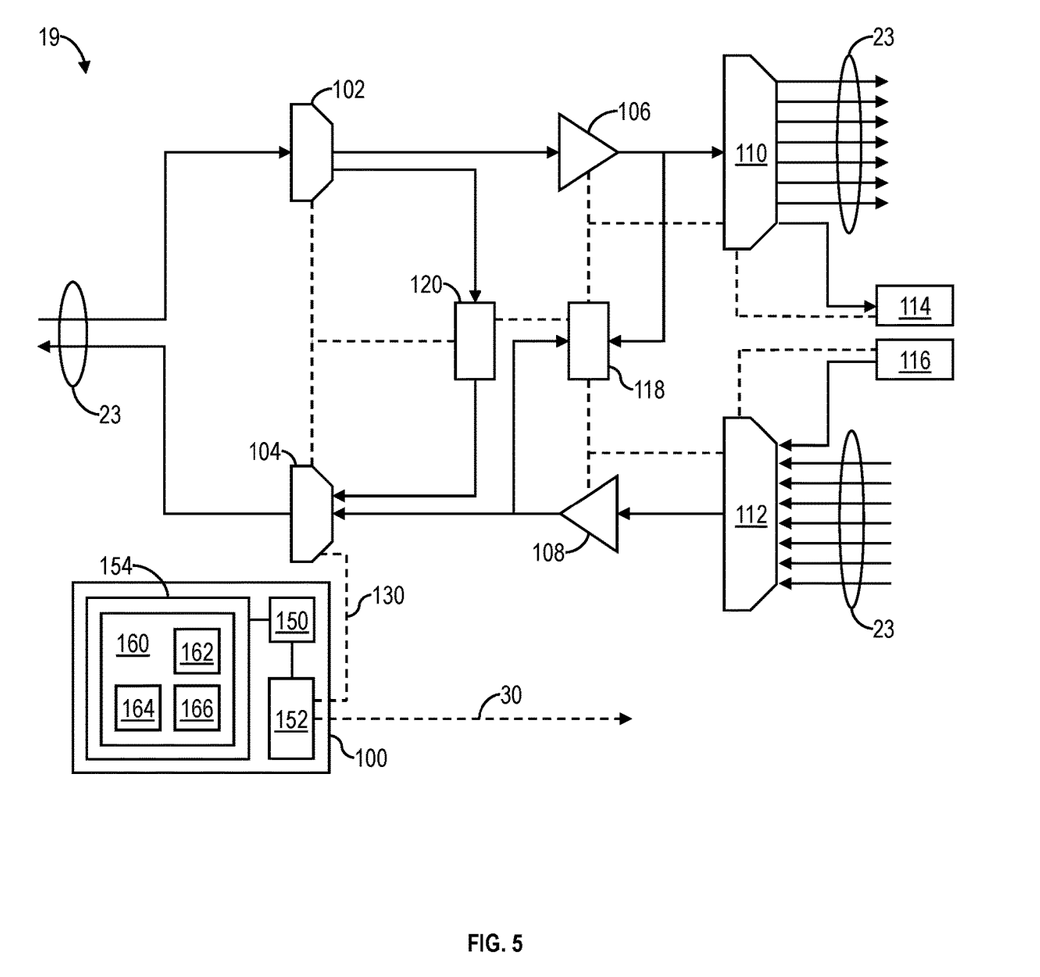
FIG. 5 is a diagrammatic view of an exemplary embodiment of an optical node for use in the system designed to dynamically, create, install, and activate loading policies that may be used to configure spectral loading in the optical network constructed in accordance with one embodiment of the present disclosure.

In an example loading algorithm, the loading management module 160 may select a list of passbands to load in a current loading management operation cycle, wherein the list comprises a number of passbands less than or equal to a predetermined maximum number of passbands. In such a loading algorithm, the list of passbands may be unsorted or sorted according to one or more input metric (e.g., channel frequency, spectral region, passband size, loading management operation type, type of service, priority, etc.). In another example loading algorithm, the loading management module 160 may select an amount of spectral content to load in a current loading management operation cycle, wherein the amount of spectral content is less than or equal to a predetermined maximum amount of spectral content.

It should be noted that the preceding loading algorithms were provided for the purposes of illustration only and should not be considered a complete list of possible loading algorithms. A person of skill in the art will appreciate that any number of loading algorithms may be dynamically created and/or edited that allow the user to change a spectral loading pattern for a given set of parameters impacting a transmission line segment 23 while the transmission line segment 23 is operational.

In an example loading policy configured for service activation, if one band (C band will be used for the purposes of illustration) is loaded and the user submits a loading request to load channels in the L band, Raman tilt may be created. Raman tilt is defined (in dB) as the difference between the power (in dB) of the longest wavelength channel and the power (in dB) of the shortest wavelength channel in the already loaded spectrum. The Raman tilt, or effect, becomes particularly pronounced when an appreciable level of optical power distributed over a certain range of wavelengths is pumped into an optical fiber. In that instance, the Raman gain is tilted in favor of the channels having the longer wavelengths. The Raman effect attenuates the power levels of the optical channels of the lower wavelengths, but increases the power levels of the optical channels of the higher wavelengths by shifting the power from the former channels to the latter channels. The Raman tilt thus degrades the Signal-to-Noise Ratio (SNR) of the signals in the lower wavelength channels and thus seriously degrades performance of the lower wavelength channels. To counter Raman tilt, the exemplary loading policy for service activation may recommend an order in which to load the new channels on the L band based on the current loading of the C band spectrum, the region of the L band into which the new channels are to be loaded, and/or the power of the wavelengths of the channels to be loaded, for instance, in a current loading management operation cycle.

In another example, a loading policy for segment activation may be created for a loading request instance where neither the C band nor the L band is loaded and channels of both the C band and L band are requested to be loaded. In this exemplary situation, Raman tilt is not a concern because there is no loaded spectrum so the exemplary loading policy for segment activation may recommend allowing all requested channels on both the C band and the L band to be loaded in a current loading management operation cycle.

In another example, a loading policy may be created that takes into account how full a band currently is. For instance, if a band is between one percent (1%) and twenty five percent (25%) full, load all of the requested bands in a current loading management operation cycle(s), if the band is between twenty six percent (26%) and fifty percent (50%) full, load 75% of the bands in a current loading management operation cycle and 25% of the bands in a subsequent loading management operation cycle(s), if the band is between fifty one percent (51%) and seventy five percent (75%) full, load 50% of the bands in a current loading management operation cycle and 50% of the bands in a subsequent loading management operation cycle(s), and if the band is between seventy six percent (76%) and one hundred percent (100%) full, load 10% of the bands in a current loading management operation cycle and 90% of the bands in subsequent loading management operation cycle(s).

In another example, a loading policy may be created that targets a predetermined QoS metric. For instance, one or more passband and one or more corresponding loading management operation may be selected in such a way as to limit a transient power excursion of one or more active optical service on the transmission line segment 23 to be less than a predetermined power (in dB) during execution of the one or more selected loading management operation.

It should be noted that the preceding loading policies were provided for the purposes of illustration only and should not be considered a complete list of possible loading policies. A person of skill in the art will appreciate that any number of loading policies may be dynamically created and/or edited that allow the user to change a spectral loading pattern for a given set of parameters impacting a transmission line segment 23 while the transmission line segment 23 is operational.

The input device 50 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 52 may be capable of outputting information in a form perceivable by the user 12 and/or processor 54. For example, implementations of the output device 52 may include, but are not limited to, a computer monitor, a screen, a touchscreen, a speaker, a website, a television set, a smart phone, a PDA, a cell phone, a fax machine, a printer, a laptop computer, combinations thereof, and the like, for example. It is to be understood that in some exemplary embodiments, the input device 50 and the output device 52 may be implemented as a single device, such as, for example, a touchscreen of a computer, a tablet, or a smartphone. It is to be further understood that as used herein the term user 12 is not limited to a human being, and may comprise a computer, a server, a website, a processor, a network interface, a human, a user terminal, a virtual computer, combinations thereof, and/or the like, for example.

The network administration device 16 may be capable of interfacing and/or communicating with the user device 14 via the network 30. For example, the network administration device 16 may be configured to interface by exchanging signals (e.g., analog, digital, optical, and/or the like) via one or more port (e.g., physical ports or virtual ports) using a network protocol, for example. Additionally, each network administration device 16 may be configured to interface and/or communicate with other network administration device 16 directly and/or via the network 30, such as by exchanging signals (e.g., analog, digital, optical, and/or the like) via one or more port.

The network 30 may permit bi-directional communication of information and/or data between the user device 14 and/or the network elements 16, 19, 20. The network 30 may interface with the user device 14 and/or the network elements 16, 19, 20 in a variety of ways. For example, in some embodiments, the network 30 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 30 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and the like, for example. Additionally, the network 30 may use a variety of network protocols to permit bi-directional interface and/or communication of data and/or information between the user device 14 and/or the network elements 16, 19, 20.

Figure 3:
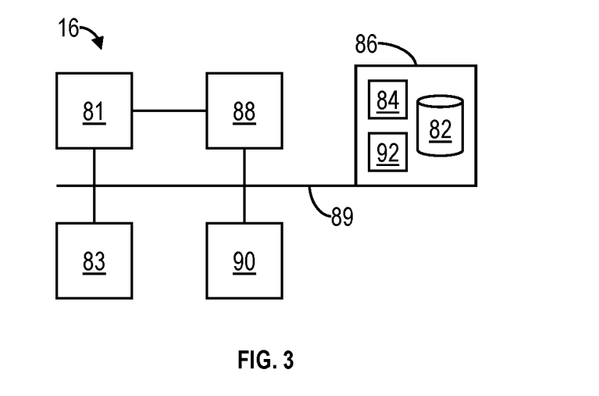
FIG. 3 is a diagrammatic view of an exemplary embodiment of the network administration device for use in the system designed to dynamically, create, install, and activate loading policies that may be used to configure spectral loading in the optical network illustrated in FIG. 1.
Figure 4:
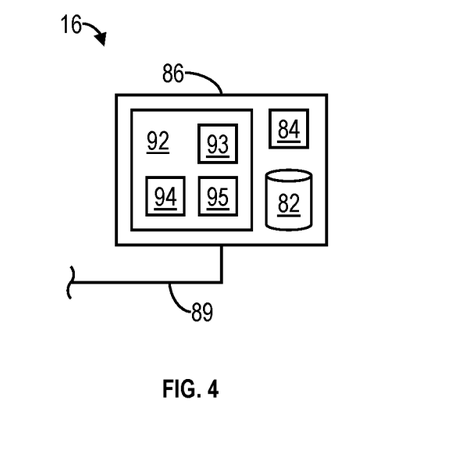
FIG. 4 is a diagrammatic view of an exemplary loading management module configured to operate on the network administration device of FIG. 3 in accordance with one embodiment of the present disclosure.

Referring now to FIGS. 3 and 4, shown therein are diagrammatic views of an exemplary embodiment of the network administration device 16. The network administration device 16 may include one or more device that gather, process, search, store, and/or provide information in a manner described herein. In the illustrated embodiment, the network administration device 16 is provided with an input device 81 one or more database 82 (hereinafter "database 82"), program logic 84, and one or more processor 88 (hereinafter "processor 88"). The program logic 84, the database 82, and a loading management module 92 may be stored on non-transitory computer readable storage memory 86 (hereinafter "memory 86") accessible by the processor 88 of the network administration device 16. It should be noted that as used herein, program logic is another term for instructions which can be executed by the processor 54 or the processor 88. The loading management module 92 may be program logic.

The database 82 can be a relational database or a non-relational database. Examples of such databases comprise, DB2®, Microsoft® Access, Microsoft® SQL Server, Oracle®, MySQL, PostgreSQL, MongoDB, Apache Cassandra, and the like. It should be understood that these examples have been provided for the purposes of illustration only and should not be construed as limiting the presently disclosed inventive concepts. The database 82 can be centralized or distributed across multiple systems.

In some embodiments, the network administration device 16 may comprise one or more processor 88 working together or independently to execute processor executable code stored on the memory 86. Additionally, each network administration device 16 may include at least one input device 81 (hereinafter "input device 81") and at least one output device 83 (hereinafter "output device 83"). Each element of the network administration device 16 may be partially or completely network-based or cloud-based and may or may not be located in a single physical location.

The processor 88 may be implemented as a single processor or multiple processors working together or independently to execute the program logic 84 as described herein. It is to be understood that in certain embodiments using more than one processor 88, the processors 88 may be located remotely from one another, located in the same location, or comprising a unitary multi-core processor. The processors 88 may be capable of reading and/or executing processor executable code and/or capable of creating, manipulating, retrieving, altering, and/or storing data structures into the memory 86.

Exemplary embodiments of the processor 88 may include, but are not limited to, a digital signal processor (DSP), a central processing unit (CPU), a field programmable gate array (FPGA), a graphics processing unit (GPU), a microprocessor, a multi-core processor, combinations, thereof, and/or the like, for example. The processor 88 may be capable of communicating with the memory 86, the input device 81, the output device 83, and/or the communication device 90 via a path 89 (e.g., data bus).

The processor 88 may be further capable of interfacing and/or communicating with the user device 14, the optical nodes 19, and/or the optical amplifiers 20 via the network 30 using the communication device 90. For example, the processor 88 may be capable of communicating via the network 30 by exchanging signals (e.g., analog, digital, optical, and/or the like) via one or more port (e.g., physical or virtual ports) using a network protocol to provide a pump model to the optical amplifier 20 as will be described in further detail herein.

The memory 86 may be capable of storing processor executable code such as program logic 84. Additionally, the memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the processor 88, and/or one or more memory 86 may be located remotely from the processor 88. For example, the memory 86 may be located remotely from the processor 88 and communicate with the processor 88 via the network 30. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer readable storage memory (i.e., one or more memory 86 may be partially or completely based on or accessed using the network 30).

The input device 81 of the network administration device 16 may transmit data to the processor 88 and may be similar to the input device 50 of the user device 14. The input device 81 may be located in the same physical location as the processor 88 or located remotely and/or partially or completely network-based. The output device 83 of the network administration device 16 may transmit information from the processor 88 to the user 12, and may be similar to the output device 52 of the user device 14. The output device 83 may be located with the processor 88, or located remotely and/or partially or completely network-based.

The memory 86 may store processor executable code and/or information comprising the database 82, program logic 84, and the loading management module 92. In some embodiments, the processor executable code 84 may be stored as a data structure, such as the database 82 and/or data table, for example, or in non-data structure format such as in a non-compiled text file.

Referring to FIG. 4, the loading management module 92 may be used to dynamically create, install, and/or activate loading policies that may be used to configure spectral loading in the transmission line segments 23 of the optical network 22 and to perform tasks as will be described in further detail herein.

The loading management module 92 may be provided with a policy loader module 93, an activated policy module 94, and a spectrum loading module 95.

The policy loader module 93 may be configured to accept and store loading policies. The loading policies may be default system loading policies that are automatically installed when the loading management module 92 is installed, for instance, or loading policies may be generated and/or edited using the user device 14 and/or the network administration device 16 and uploaded or installed over the network 30, for instance. The loading policies may be edited, installed, and/or created using a management interface such as GUI 18 described above. Loading policies may be created by a network operator (e.g., user 12) or a third party such as a distributor or manufacturer of one or more element of the network 22, such as the network elements 16, 19, 20, for instance. Loading policies that are created by third parties may be distributed and installed in the policy loader module 93 using any suitable methodology.

The policy loader module 93 may contain any number of loading policies that may be activated when needed based on the static datapoints and the dynamic datapoints associated with the transmission line segment 23, for instance. In other words, the policy loader module 93 may contain loading policies that are not currently being used but may be activated for use by the network operator to accommodate for changes in the transmission line segment 23, for instance.

The activated policy module 94 may be configured to contain loading policies that have been activated based on the static datapoints and the dynamic datapoints associated with a given transmission line segment such as transmission line segment 23. In an exemplary operation of the system 10, the user 12 may use the GUI 18 to review loading policies contained in the policy loader module 93 and activate one or more desired loading policy. Upon activation, the loading management module 92 may be configured to fetch or move the activated loading policy from the policy loader module 93 to the activated policy module 94 and initialize loading parameters associated with the activated loading policy to be used when the user 12 initiates a loading request. In some embodiments, the loading management module 92 may be configured to fetch a particular loading policy based on whether the optical transmission system 10 is provided with an ASE idler.

Every release or version of the loading management module 92 may include system loading policies that may be referred to as static loading policies. These static loading policies address loading parameters based on a typical transmission line segment of a customer or network operator. The static loading policies may be based on loading parameters collected from simulations using a gaussian noise (GN) simulator, interpolation, data collected in the field, and lab testing, for instance. Generally, the loading management module 92 is provided with a static loading policy for aggressive power change during channel loading and a static loading policy for conservative power change during channel loading.

In an exemplary use of the system 10, after release of the loading management module 92, operating conditions and/or make up of the network 22 may change. To account for these changes, the user 12 (e.g., network operator) may change the spectral loading pattern to achieve a desired loading behavior by selecting a loading policy from the policy loader module 93, creating a new loading policy, or editing an existing loading policy. To differentiate from the static loading policies, loading policies that may be selected, created, and/or edited depending on the characteristics and the current loading of the transmission line segment 23 may be referred to as dynamic loading policies. These dynamic loading policies allow the user 12 to change the spectral loading pattern to achieve the desired loading behavior while the transmission line segment 23 is operational.

In some embodiments, dynamic loading policies that were created or edited during operation of the transmission line segment 23 during one release of the system software may be packaged as static loading policies that are automatically loaded with a new release of the system software.

It should be noted that while the exemplary loading policies discussed above may be characterized as being primarily directed to one loading parameter, loading policies may be created that are directed to multiple loading parameters of the transmission line segment and/or a loading management module 92 may be configured to use a collection of loading policies (i.e., a combination of more than one loading policy) to account for all loading parameters that may influence a loading pattern in the transmission line segment 23. For example, some fiber types are not recommended for aggressive loading. Therefore, if a loading request is received for transmission line segment 23 activation of channels on both the C and L bands for a transmission line segment 23, but the transmission line segment 23 includes a fiber type not recommended for aggressive loading, the exemplary loading policy for segment activation that recommended allowing all requested channels on both the C band and the L band to be loaded during a current loading management operation cycle would be too aggressive for the topology of the transmission line segment 23. In that situation, the loading management module 92 may be configured to use a combination of loading policies and loading algorithms to generate a loading response with more conservative loading, e.g., to generate a loading response identifying a subset of the loading management operations to be executed in the current loading management operation cycle.

The spectrum loading module 95 may be configured to obtain dynamic datapoints associated with the transmission line segment, such as a current spectral loading of the network 22 and/or loading of transmission line segment 23. For instance, the spectrum loading module 95 may be provided with instructions that cause the processor 88 to send a signal over the network 30 to the optical nodes 19a and 19b to obtain the dynamic datapoints. In an exemplary embodiment, the spectrum loading module 95 may be configured to obtain the dynamic datapoints substantially in real time when the user 12 submits a loading request. In other words, when the user 12 submits the loading request, the spectrum loading module 95 may be programmed to automatically obtain the dynamic datapoints associated with the transmission line segment 23, for instance, from the optical nodes 19a and 19b. In another exemplary embodiment, the spectrum loading module 95 may be configured to obtain the dynamic datapoints at predetermined intervals of time and store the dynamic datapoints in the memory 86 associated with the transmission line segment 23, for instance. The loading management module 92 may use the static datapoints, the dynamic datapoints, the activated loading policies, the loading request submitted by the user, and one or more loading algorithm to generate a loading response comprising a filtered pending list comprising a subset of the loading management operations in the pending list to be executed in the current loading management operation cycle.

Optical nodes 19a and 19b may include one or more device that gather, process, store, and/or provide information in a manner described herein. For example, the optical nodes 19a and 19b may include one or more optical data processing and/or traffic transfer device, such as an optical add-drop multiplexer ("OADM"), a reconfigurable optical add-drop multiplexer ("ROADM"), or a flexibly reconfigurable optical add-drop multiplexer module ("FRM"), and/or any type of device capable of processing and/or transferring optical traffic.

In some implementations, optical nodes 19a and/or 19b may include OADMs and/or ROADMs capable of being configured to add, drop, multiplex, and demultiplex optical signals. Optical nodes 19a and/or 19b may process and transmit optical signals to other optical nodes 19 (not shown) throughout optical network 22 in order to deliver optical transmissions.

Referring now to FIG. 5, shown therein is a diagrammatic view of an exemplary optical node 19 of optical network 22 that may be monitored and/or configured according to implementations described herein. The optical nodes 19a and 19b may be constructed similarly as the optical node 19, described below. In accordance with the present disclosure, the optical node 19 may be a ROADM within the fiber of the optical network 22, that allows dynamic, algorithm-driven loading changes to a spectral loading pattern from a remote management system such as the loading management module 92 on the network administration device 16.

The optical node 19 may be provided with a controller 100, an input filter 102, an output filter 104, an input amplifier 106, an output amplifier 108, a de-multiplexer (DEMUX) WSS 110, a multiplexer (MUX) WSS 112, at least one drop transceiver 114, at least one add transceiver 116, an optical channel monitor (OCM) 118, and an optical supervisory channel (OSC) 120. It should be noted that the elements of optical node 19 are shown for illustration purposes only and should not be considered limiting. For instance, the illustrated optical node 19 is one possible realization of a single degree of a ROADM. However, the optical node 19 may be implemented as a multi-degree ROADM with a launch power for each transmission line segment 23 serviced by the optical node 19 implemented in accordance with the inventive concepts described herein. Further, the at least one drop transceiver 114 and the at least one add transceiver 116 may be implemented as a line card having multiple add and drop transceivers and may be configured to service channels across multiple ROADM degrees.

The OCM 118 provides the ability to monitor a power level of each wavelength. This dynamic datapoint can then be used by the controller 100 to attenuate each wavelength with the DEMUX WSS 110 and/or the MUX WSS 112 at ROADM sites or dynamic gain equalization (DGE) at optical amplifier 20 sites in order to optimize the power level of each wavelength. OCM 118 can also be used to troubleshoot the optical network 22. Recent innovations include flexible-grid OCMs and higher-resolution coherent OCMs. Coherent OCMs offer sub-GHz accuracy and highly accurate power monitoring of fine spectral slices independent of adjacent channel power. Coherent OCMs reduce the C-band scanning time from seconds to hundreds of milliseconds and provide advanced processing of spectral characteristics, such as valid channel detection, center wavelength, and optical signal-to-noise ratio (OSNR).

The OSC 120 provides a communication channel between adjacent nodes such as optical nodes 19a and 19b that can be used for functions including link control, in-band management, control plane (i.e., ASON/GMPLS), and span loss measurement. Static datapoints associated with the transmission line segment 23 (e.g., fiber types, loss, amplifier types, etc.) downstream from the optical node 19 can be communicated to the controller 100 via the OSC 120.

The optical node 19 is illustrated with the controller 100 for controlling the elements of the optical node 19. The optical node 19 may be provided with an interface 130 that connects the controller 100 to the elements of the optical node 19.

The controller 100 may be a microcontroller, for instance, that is provided with a processor 150, a communication device 152, and a non-transitory computer readable memory 154 ("memory 154"). The memory 154 may store a loading management module 160 that may be used to dynamically edit, install, and/or activate loading policies that may be used to configure spectral loading in the transmission line segment 23 of the optical network 22 and to perform tasks, as will be described in further detail herein.

The loading management module 160 may be provided with a policy loader module 162, an activated policy module 164, and a spectrum loading module 166.

The policy loader module 162, activated policy module 164, and the spectrum loading module 166 are configured and operate substantially the same as the policy loader module 93, the activated policy module 94, and the spectrum loading module 95 described above. The description of the policy loader module 93, activated policy module 94, and the spectrum loading module 95 are hereby incorporated by reference and, in the interest of brevity, the policy loader module 162, activated policy module 164, and the spectrum loading module 166 will not be described in further detail.

In some embodiments, the controller 100 may not be provided with the loading management module 160 but instead be provided with a set of processor executable instructions (not shown) that cause the processor 150 to receive a signal including a loading response identifying a filtered pending list (e.g., a subset of the loading management operations in the pending list to be executed in the current loading management operation cycle) from the loading management module 92 of the network administration device 16 and load the passbands identified in the filtered pending list to change the spectral loading pattern.

The number of devices illustrated in FIG. 5 are provided for explanatory purposes. In practice, there may be additional devices, fewer devices, different devices, or differently arranged devices than are shown in FIG. 5. Furthermore, two or more of the devices illustrated in FIG. 5 may be implemented within a single device, or a single device illustrated in FIG. 5 may be implemented as multiple, distributed devices. Additionally, one or more of the devices illustrated in FIG. 5 may perform one or more function described as being performed by another one or more of the devices illustrated in FIG. 5. Devices illustrated in FIG. 5 may interconnect via wired connections (e.g., fiber-optic connections).

Figure 6:
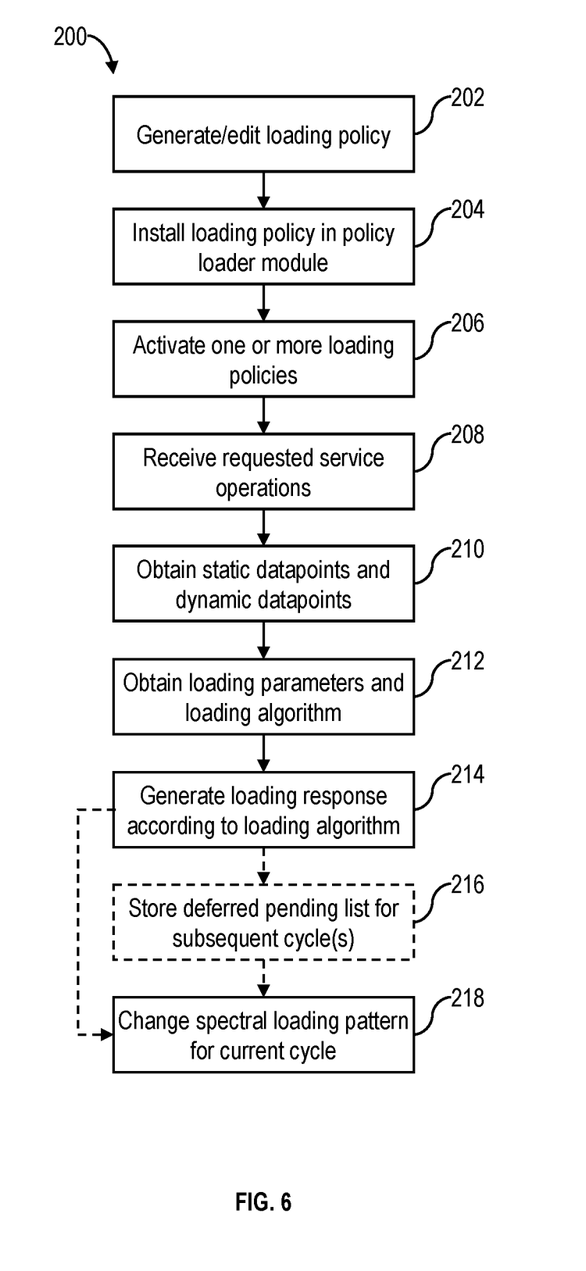
FIG. 6 is a workflow diagram of an exemplary method for generating a loading response using the loading management module of FIG. 4 in accordance with one embodiment of the present disclosure.

Referring now to FIG. 6, shown therein is an exemplary workflow diagram of a method 200 for generating a loading response that may be used to change a spectral loading pattern of a transmission line segment using the system 10. For the purposes of illustration, the method 200 will be described using an embodiment of the system 10 with the loading management module 92 operating on the network administration device 16. However, it should be noted that the method 200 described would operate substantially the same in an embodiment of the system 10 with the loading management module 160 operating on a network element 16, 19, 20, such as the optical node 19a and/or 19b, a centralized orchestrator, or a cloud-based controller.

In step 202, a new loading policy may be generated. As explained above, the new loading policy may be generated from scratch from user input or an existing loading policy may be edited and saved as the new loading policy.

In step 204, the new loading policy may be installed (i.e., saved or stored) in the policy loader module 93. In one exemplary operation of the system 10, the new loading policy may be generated by the user 12 using the GUI 18 on the user device 14 and installed in the policy loader module 93 of the network administration device 16. In another exemplary operation of the system 10, the new loading policy may be generated on the network administration device 16 and installed in the policy loader module 93.

In step 206, the user 12 may activate one or more loading policy installed in the policy loader module 93. In one exemplary operation of the system 10, the user 12 may use the GUI 18 to review loading policies installed in the policy loader module 93 and select one or more of the installed loading policies to activate, for example. In such an embodiment, the GUI 18 may be provided with one or more button or other selectable elements configured to accept input from the user 12 indicating selection of the one or more loading policy and input indicating a desire to activate the one or more loading policy. Upon input from the user 12, the GUI 18 may be programmed to cause the user device 14 to send a signal to the loading management module 92 that causes the loading management module 92 to move the one or more loading policy from the policy loader module 93 to the activated policy module 94.

In step 208, the system 10 receives one or more loading request (i.e., a plurality of requested service operations) for the transmission line segment 23 from the user 12. For instance, the user 12 may input one or more loading request using the GUI 18 on the user device 14. The loading request(s) may identify a pending list comprising a plurality of loading management operations to be executed in either of a current loading management operation cycle or one or more subsequent loading management operation cycle. Exemplary loading management operations may include a number of channels to be brought up or down on a transmission line segment such as transmission line segment 23, or a band to activate or deactivate, for instance. Once the loading request is input by the user 12, the GUI 18 may be programmed to cause the processor 54 to send a signal containing the loading request to the loading management module 92 on the network administration device 16.

In some embodiments, at least one of the loading management operations in the pending list may identify one or more passband spanning a plurality of wavelengths. In other embodiments, the requested service operations may identify a single loading management operation to be executed in either of the current loading management operation cycle or one or more subsequent loading management operation cycle. In such embodiments, the single loading management operation may identify a single passband spanning a plurality of wavelengths.

In step 210, upon receipt of the loading request, the loading management module 92 may be programmed to cause the processor 88 to obtain one or more static datapoint of the transmission line segment 23 from the database 82 and one or more dynamic datapoint of the transmission line segment 23 from the spectrum loading module 95.

In step 212, upon receipt of the loading request, the loading management module 92 may be programmed to cause the processor 88 to obtain loading parameters from the activated policy module 94.

It should be noted that it is not necessary to perform steps 210 and 212 in order. In some embodiments, step 212 may be performed before step 210. In other embodiments, steps 210 and 212 may be performed substantially simultaneously.

In step 214, the loading management module 92 may be configured to use the static datapoints obtained from the database 82, the dynamic datapoints obtained from the spectrum loading module 95, and the loading parameters obtained from the activated policy module 94 to generate a loading response according to the one or more loading algorithm. The loading response may identify a filtered pending list comprising a subset of the loading management operations in the pending list to be executed in the current loading management operation cycle.

In some embodiments, at least one of the subset of the loading management operations in the pending list may identify at least one first sub-passband (shown in FIG. 7) spanning at least one of the plurality of wavelengths. As used herein, a sub-passband is a portion of a passband with a smaller spectral size than the passband, which may allow the loading management system described herein to optimize the spectral loading with more granularity. In embodiments where the requested service operations identify a single loading management operation, the subset of the loading management operations may be a first loading management sub-operation to be executed in the current loading management operation cycle. In such embodiments, the first loading management sub-operation may identify a first sub-passband spanning at least one of the plurality of wavelengths.

In some embodiments, in step 216, the loading management module 92 may be configured to generate and store a deferred pending list in the memory 86 associated with the transmission line segment 23, for instance. The deferred pending list may comprise a remainder of the loading management operations in the pending list to be executed in one or more subsequent loading management operation cycle.

In some embodiments where the loading management module 92 is configured to generate and store the deferred pending list, in one or more subsequent loading management operation cycle, the system 10 may receive one or more updated loading request identifying an updated pending list comprising a plurality of loading management operations to be executed in either of a then-current loading management operation cycle or one or more subsequent loading management operation cycle. In response to receiving the updated loading request, the loading management module 92 may be configured to update the deferred pending list (i.e., by adding or removing loading management operations) based on the updated pending list.

In some embodiments where the loading management module 92 is configured to generate and store the deferred pending list, at least one of the remainder of the loading management operations in the deferred pending list may identify at least one second sub-passband spanning at least one of the remainder of the plurality of wavelengths. In embodiments where the requested service operations identify a single loading management operation, the remainder of the loading management operations in the deferred pending list may be a second loading management sub-operation to be executed in the one or more subsequent loading management operation cycle. In such embodiments, the second loading management sub-operation may identify a second sub-passband spanning at least one of the remainder of the plurality of wavelengths.

In step 218, the loading management module 92 may be configured to send a signal containing the loading response to one or both of the optical node 19a or 19b, the signal configured to cause the optical nodes 19a and 19b to change a spectral loading pattern of the transmission line segment 23 based on the loading response.

In some embodiments, if the loading management module 92 receives at least one additional loading policy in the current loading management operation cycle, the loading management module 92 may be configured to activate at least one of the at least one additional loading policy in one or more subsequent loading management operation cycle.

Figure 7:
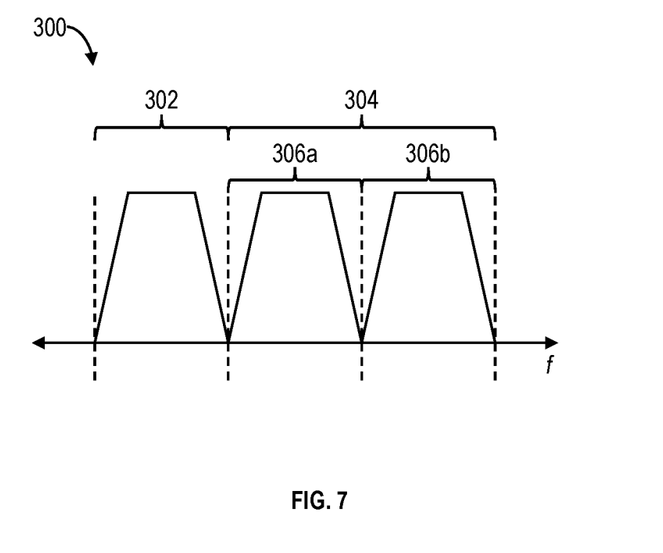
FIG. 7 is a diagrammatic view of an exemplary embodiment of a portion of an optical signal for loading by the network administration device of FIG. 1 in accordance with one embodiment of the present disclosure.

Referring now to FIG. 7, shown therein is an exemplary portion 300 of an optical signal for loading by the loading management system of FIG. 1. Generally, the loading management operations may identify a passband spanning a single wavelength, such as the first passband 302 shown in FIG. 7. However, as described above, in some embodiments, at least one of the loading management operations in the pending list may identify at least one passband spanning a plurality of wavelengths, such as the second passband 304 shown in FIG. 7. In such embodiments, the loading management module 92 may be configured to separate such a passband into a plurality of sub-passbands, such as the first sub-passband 306a and the second sub-passband 306b shown in FIG. 7, which may allow the loading management system to optimize the spectral loading with more granularity. Accordingly, a loading management operation (e.g., an activation) may be executed on the first sub-passband 306a in the current loading management operation cycle and the second sub-passband 306b may be added to the deferred pending list for execution in one or more subsequent loading management operation cycle.

CONCLUSION

Conventionally, optical line systems are not provided with loading management modules or are provided only with static rulesets by which the loading management module may select loading management operations to be executed in a current loading management operation cycle. When the user or the system requests a loading change, for example, the conventional optical line system executes the operation without considering potential transient effects. The methods and systems disclosed herein solve these problems by providing a loading management module that is configured to filter, sort, and/or prioritize service change requests using loading algorithms to dynamically manage power transients, maintain system performance during loading changes, or achieve some other objective of the user or the system.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:
 a processor and a non-transitory computer readable memory storing instructions that, when executed by the processor, cause the processor to:
  obtain and store at least one loading policy for a transmission line segment that is currently operating, the at least one loading policy comprising a combination of loading parameters and one or more loading algorithm for one or more loading management operation type associated with the transmission line segment;
  activate at least one of the at least one loading policy;
  receive a plurality of requested service operations to change a spectral loading pattern of the transmission line segment, the requested service operations identifying a plurality of loading management operations to be executed in either of a current loading management operation cycle or one or more subsequent loading management operation cycle;
  obtain one or more static datapoint and one or more dynamic datapoint associated with the transmission line segment;
  obtain the loading parameters and the one or more loading algorithm from the at least one of the at least one loading policy that was activated;
  generate, according to the one or more loading algorithm, a loading response based at least in part on the one or more static datapoint, the one or more dynamic datapoint, and the loading parameters from the at least one of the at least one loading policy that was activated, the loading response identifying a subset of the loading management operations to be executed in the current loading management operation cycle; and change the spectral loading pattern of the transmission line segment based on the loading response.

2. The network element of claim 1, wherein the loading parameters are selected from a group consisting of one or more of a region in an optical spectrum where the spectral loading pattern of the transmission line segment is to be changed; a maximum power change allowed due to loading; a loading factor for a given range of current loading; an allowable loading limit for a given range of current loading; whether to consider loading criteria; topology of the transmission line segment; a particular loading management operation type of each of the loading management operations; a frequency range of each of the loading management operations; and a bandwidth of each of the loading management operations.

3. The network element of claim 1, wherein the one or more loading management operation type is selected from a group consisting of service activation, service deactivation, band activation, band deactivation, segment activation, and segment deactivation.

4. The network element of claim 1, wherein the instructions, when executed by the processor, further cause the processor to store a deferred pending list comprising a remainder of the loading management operations to be executed in one or more subsequent loading management operation cycle.

5. The network element of claim 4, wherein at least one of loading management operations identifies at least one passband spanning a plurality of wavelengths, at least one of the subset of the loading management operations identifies at least one first sub-passband spanning at least one of the plurality of wavelengths, and at least one of the remainder of the loading management operations in the deferred pending list identifies at least one second sub-passband spanning at least one of a remainder of the plurality of wavelengths.

6. The network element of claim 4, wherein:
the requested service operations identify a single loading management operation to be executed in either of a current loading management operation cycle or one or more subsequent loading management operation cycle, the single loading management operation identifying a single passband spanning a plurality of wavelengths;
the subset of the loading management operations is a first loading management sub-operation to be executed in the current loading management operation cycle, the first loading management sub-operation identifying a first sub-passband spanning at least one of the plurality of wavelengths; and
the remainder of the loading management operations in the deferred pending list is a second loading management sub-operation to be executed in one or more subsequent loading management operation cycle, the second loading management sub-operation identifying a second sub-passband spanning at least one of the remainder of the plurality of wavelengths.

7. The network element of claim 1, wherein the one or more static datapoint is selected from a group consisting of at least one of a length of one or more fiber span, a type of fiber in each of the one or more fiber span, a type of amplifier, a type of ROADM, a capability of the transmission line segment to carry optical signals within a C band and an L band, and whether the transmission line segment is provided with an ASE idler.

8. The network element of claim 1, wherein the one or more dynamic datapoint is selected from a group consisting of at least one of an operational status of the transmission line segment to carry optical signals within a C band and an L band, an operational status of an ASE idler, an operational status of one or more active optical service, an operational status of one or more passband, offsets that are being configured, and a current spectral loading of the transmission line segment.

9. The network element of claim 1, wherein the at least one loading policy is selected based on whether the transmission line segment is provided with an ASE idler.

10. The network element of claim 1, wherein the instructions, when executed by the processor, further cause the processor to obtain and store, in the current loading management operation cycle, at least one additional loading policy, and activate, in one or more subsequent loading management operation cycle, at least one of the at least one additional loading policy.

11. A method for configuring a spectral loading pattern, comprising:
obtaining at least one loading policy for a transmission line segment that is currently operating, the at least one loading policy comprising a combination of loading parameters and one or more loading algorithm for one or more loading management operation type associated with the transmission line segment;
activating, at a network element of the transmission line segment, at least one of the at least one loading policy;
receiving a plurality of requested service operations to change a spectral loading pattern of the transmission line segment, the requested service operations identifying a plurality of loading management operations to be executed in either of a current loading management operation cycle and one or more subsequent loading management operation cycle;
obtaining one or more static datapoint and one or more dynamic datapoint associated with the transmission line segment;
obtaining the loading parameters and the one or more loading algorithm from the at least one of the at least one loading policy that was activated;
generating, according to the one or more loading algorithm, a loading response based at least in part on the one or more static datapoint, the one or more dynamic datapoint, and the loading parameters from the at least one of the at least one loading policy that was activated, the loading response identifying a subset of the loading management operations to be executed in the current loading management operation cycle; and
changing the spectral loading pattern of the transmission line segment based on the loading response.

12. The method of claim 11, wherein the loading parameters are selected from a group consisting of one or more of a region in an optical spectrum where the spectral loading pattern of the transmission line segment is to be changed; a maximum power change allowed due to loading; a loading factor for a given range of current loading; an allowable loading limit for a given range of current loading; whether to consider loading criteria; topology of the transmission line segment; a particular loading management operation type of each of the loading management operations; a frequency range of each of the loading management operations; and a bandwidth of each of the loading management operations.

13. The method of claim 11, wherein the one or more loading management operation type is selected from a group consisting of service activation, service deactivation, band activation, band deactivation, segment activation, and segment deactivation.

14. The method of claim 11, further comprising storing a deferred pending list comprising a remainder of the loading management operations to be executed in one or more subsequent loading management operation cycle.

15. The method of claim 14, wherein:
receiving the requested service operations is further defined as receiving the requested service operations, wherein at least one of the loading management operations identifies at least one passband spanning a plurality of wavelengths;
generating the loading response is further defined as generating the loading response, wherein at least one of the subset of the loading management operations identifies at least one first sub-passband spanning at least one of the plurality of wavelengths; and
storing the deferred pending list is further defined as storing the deferred pending list, wherein at least one of the remainder of the loading management operations in the deferred pending list identifies at least one second sub-passband spanning at least one of a remainder of the plurality of wavelengths.

16. The method of claim 14, wherein:
receiving the requested service operations is further defined as receiving the requested service operations, wherein the requested service operations identify a single loading management operation to be executed in either of a current loading management operation cycle or one or more subsequent loading management operation cycle, the single loading management operation identifying a single passband spanning a plurality of wavelengths;
generating the loading response is further defined as generating the loading response, wherein the subset of the loading management operations is a first loading management sub-operation to be executed in the current loading management operation cycle, the first loading management sub-operation identifying a first sub-passband spanning at least one of the plurality of wavelengths; and
storing the deferred pending list is further defined as storing the deferred pending list, wherein the remainder of the loading management operations in the deferred pending list is a second loading management sub-operation to be executed in one or more subsequent loading management operation cycle, the second loading management sub-operation identifying a second sub-passband spanning at least one of the remainder of the plurality of wavelengths.

17. The method of claim 11, wherein obtaining the one or more static datapoint and the one or more dynamic datapoint is further defined as obtaining the one or more static datapoint and the one or more dynamic datapoint, wherein the one or more static datapoint is selected from a group consisting of at least one of a length of one or more fiber span, a type of fiber in each of the one or more fiber span, a type of amplifier, a type of ROADM, a capability of the transmission line segment to carry optical signals within a C band and an L band, and whether the transmission line segment is provided with an ASE idler.

18. The method of claim 11, wherein obtaining the one or more static datapoint and the one or more dynamic datapoint is further defined as obtaining the one or more static datapoint and the one or more dynamic datapoint, wherein the one or more dynamic datapoint is selected from a group consisting of at least one of an operational status of the transmission line segment to carry optical signals within a C band and an L band, an operational status of an ASE idler, an operational status of one or more active optical service, an operational status of one or more passband, offsets that are being configured, and a current spectral loading of the transmission line segment.

19. The method of claim 11, wherein obtaining the at least one loading policy is further defined as obtaining the at least one loading policy based on whether the transmission line segment is provided with an ASE idler.

20. The method of claim 11, further comprising:
obtaining and storing, in the current loading management operation cycle, at least one additional loading policy; and
activating, in one or more subsequent loading management operation cycle, at least one of the at least one additional loading policy.

* * * * *